United States Patent [19]
Cox et al.

[11] Patent Number: 5,168,978
[45] Date of Patent: Dec. 8, 1992

[54] CONVEYOR WITH TRANSVERSE POSITIONING

[75] Inventors: Ian W. D. Cox, Gerrards Cross, England; Jeffrey Hoffman, Caledonia, Wis.; Michael B. Henrickson, Racine, Wis.; Howard C. Phillips, Bristol, Wis.

[73] Assignee: Cintex of America Inc., Kenosha, Wis.

[21] Appl. No.: 594,264

[22] Filed: Oct. 9, 1990

[51] Int. Cl.⁵ .............................. B65G 47/46
[52] U.S. Cl. .................... 198/369; 198/436; 198/817
[58] Field of Search .............. 198/817, 369, 436, 631, 198/861.2, 861.6

[56] References Cited

U.S. PATENT DOCUMENTS

| | | |
|---|---|---|
| 1,401,909 | 12/1921 | Hurt . |
| 2,310,160 | 2/1943 | Cohen . |
| 2,880,847 | 4/1959 | Kelley ........................ 198/817 X |
| 3,844,403 | 10/1974 | Stauber . |
| 3,917,505 | 11/1975 | Schulze ........................ 198/817 X |
| 3,982,625 | 9/1976 | Wentz et al. . |
| 4,043,442 | 8/1977 | Greenwell et al. . |
| 4,553,658 | 11/1985 | Gasser ........................ 198/436 X |
| 4,846,336 | 7/1989 | Hoyland et al. ............. 198/436 X |

Primary Examiner—D. Glenn Dayoan
Attorney, Agent, or Firm—Quarles & Brady

[57] ABSTRACT

A conveyor system having transverse positions for use in conjunction with diverting or sorting and detecting operations. The conveyor system employs elastic strand members which are driven by a drive roller connected to a supporting frame in a transversely fixed manner while the strands are moved transversely by a guide roller positioned at an opposite end of the supporting frame. The conveyor system is especially adaptable to dynamic weighing and counting systems. The conveyor system affords a rapid adjustment for different transverse positions employing a positioning mechanism which is activated by two fluid and preferably pneumatically driven cylinders with activating rods.

16 Claims, 4 Drawing Sheets

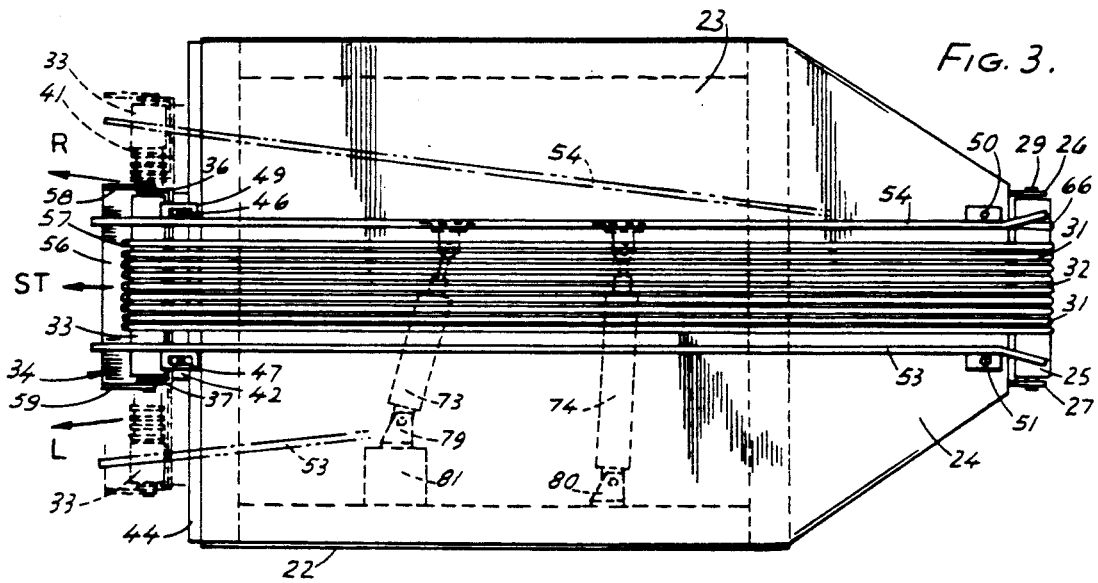
FIG. 3.
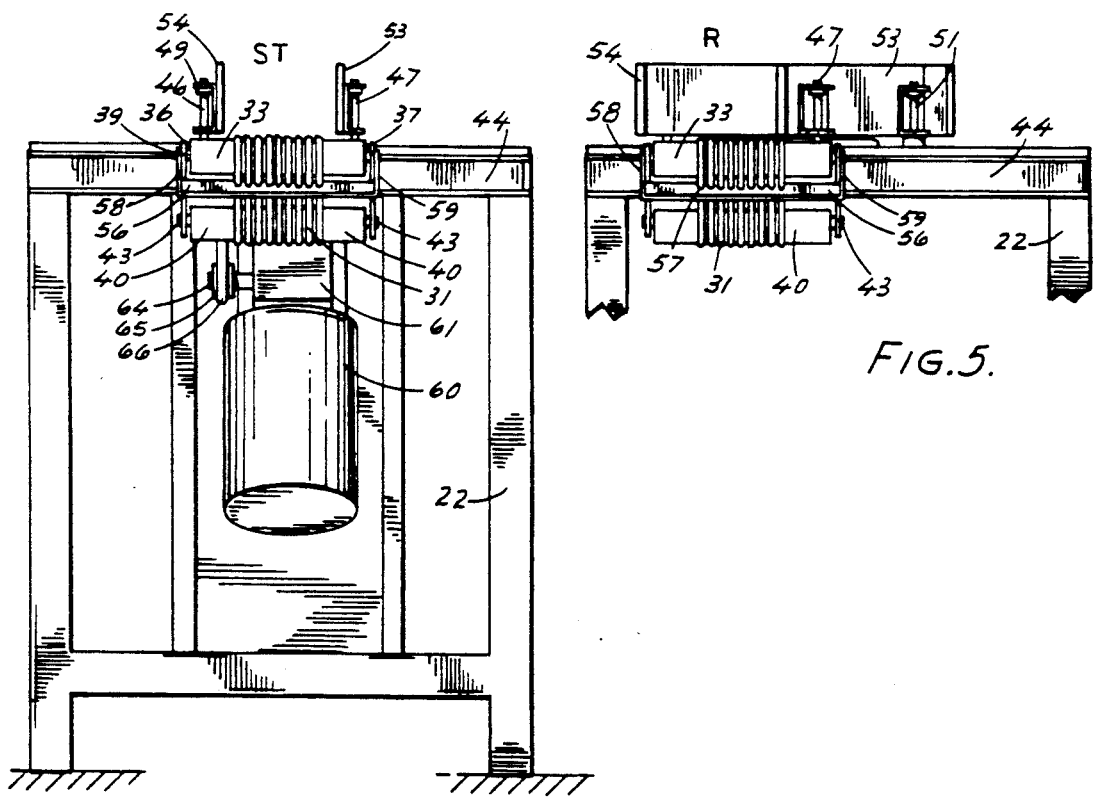
FIG. 5.
FIG. 4.

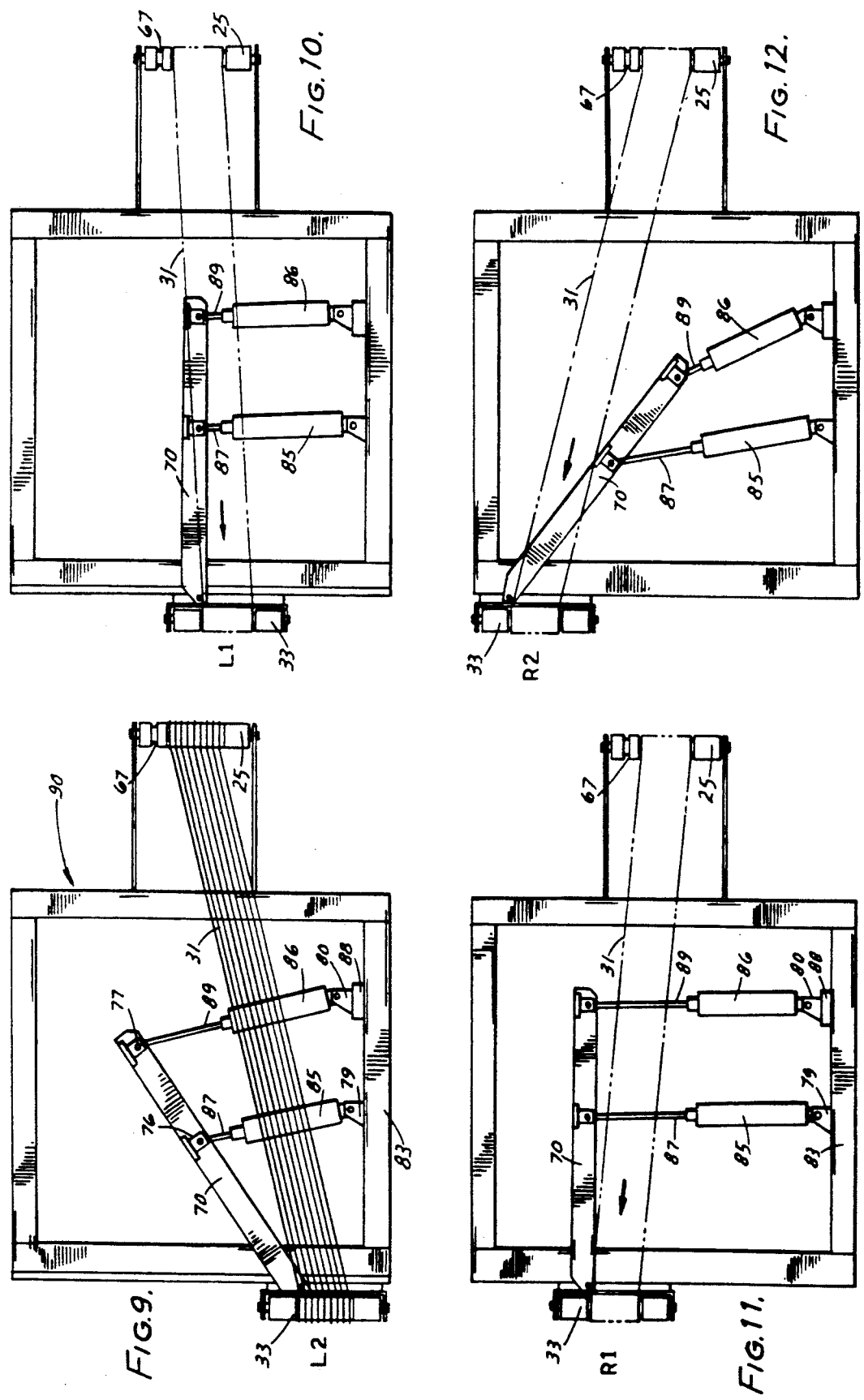

CONVEYOR WITH TRANSVERSE POSITIONING

BACKGROUND OF THE INVENTION

This invention relates to a conveyor which can be operated in two or more transverse positions. More particularly, it relates to a multi-positioned conveyor for diverting and channelizing products wherein the conveyor includes a multiplicity of elastic strands for transporting material over the conveyor.

It is known in the prior art to employ conveyors which have multiple positions so as to divert a product from one conveyor to different stations such as would be used in conjunction with a sorting system. For example, in U.S. Pat. No. 4,043,442 a transfer mechanism utilizing a conveyor system is employed wherein the conveyors can be swung in a transverse manner by a camming arrangement in conjunction with linking arm members. In U.S. Pat. No. 3,982,625 a pivot bearing is disclosed for oscillating a typical conveyor having a belt for the purpose of depositing items on a moving conveyor.

U.S. Pat. No. 3,844,403 shows a flexible conveyor which is provided with a resiliently bendable outrigger with a leaf spring which is clamped on one end. U.S. Pat. No. 2,310,160 also shows pivotable conveyors which are diverted for distribution purposes. In U.S. Pat. No. 1,401,909 a cross member is provided for the purpose of horizontally moving a conveyor in the form of an elevator.

All of the foregoing prior art conveyor systems either utilize standard conveyor units for moving into various positions or conveyor systems which are complex in their construction and do not lend themselves to rapid transverse positioning. Many of the prior art mechanisms are costly to manufacture as well as to maintain.

Accordingly, it is an advantage of this invention to provide an improved conveyor system which employs fewer components as compared to prior art mechanisms and thus has lower maintenance and initial costs.

It is another advantage of this invention to provide a conveyor system of the foregoing type which is fast acting and can be positioned in two or more different positions.

It is still another advantage of this invention to provide a conveyor system of the foregoing type which employs a unique operating mechanism for positioning the conveyor.

It is yet another advantage of this invention to provide a conveyor system of the foregoing type wherein the component parts can be easily replaced for maintenance purposes, thus reducing production downtime.

SUMMARY OF THE INVENTION

The foregoing advantages are accomplished and the shortcomings of the prior art are overcome by the conveyor of this invention which has two or more transverse positions. The conveyor includes a supporting frame member having a supporting surface. A drive roller is operatively connected to one end of the supporting frame in a fixed transversely manner with respect to the supporting surface and the drive roller is adapted to be connected to drive means. A guide roller is operatively connected to an opposing end of the supporting frame in a transversely movable manner with respect to the supporting surface. Elastic strand members are positioned in a drivable relationship with respect to the drive roller and are movable transversely by the guide roller.

In a preferred manner positioning means are operatively connected to the guide roller and located between the drive roller and the guide roller. The positioning means includes an arm member pivotally connected to the guide roller at one end and pivotally attached to two extension members at points spaced from the one end with the extension members being connected to the supporting frame member.

In still another preferred manner the extension members are fluid activated cylinder members having extending and retracting rod members with the rod members pivotally attached at one end to the arm member and the cylinder members pivotally attached to the supporting frame member at an opposite end.

In one aspect of the invention the elastic strand members are formed from a plastic material and a portion of each of the drive and guide rollers is positioned below the supporting surface with the guide roller located along an edge of the supporting surface.

In yet another aspect of the invention the conveyor can be positioned in at least three different locations.

BRIEF DESCRIPTION OF THE DRAWINGS

A better understanding of the present invention can be accomplished by reference to the drawings wherein:

FIG. 3 is a top plan view of the conveyor shown in FIG. 2.

FIG. 4 is an end view of the conveyor shown in FIG. 3.

FIG. 5 is a partial view similar to FIG. 4 showing an alternative position for the conveyor.

FIGS. 9, 10, 11 and 12 are top plan views illustrating an alternative embodiment of the invention and illustrating a four position conveyor system.

DETAILED DESCRIPTION OF THE PREFERRED EMBODIMENTS

Figure 1:
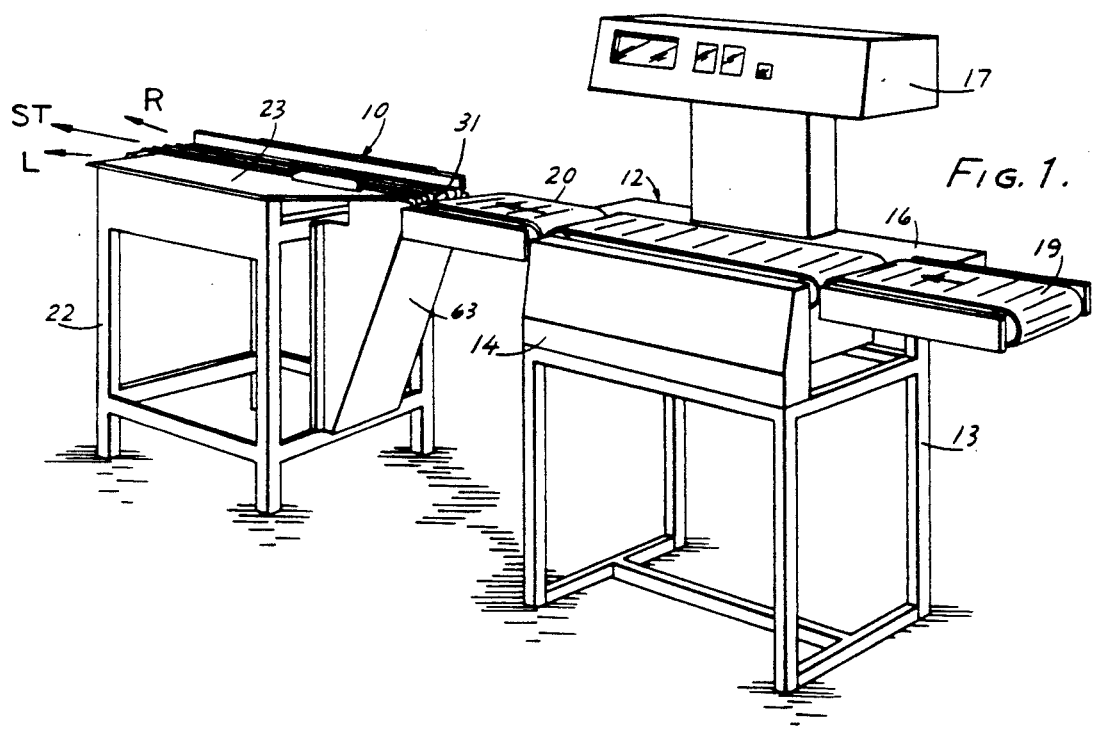
FIG. 1 is a perspective view of the conveyor shown in conjunction with a check weighing system.

Referring to FIG. 1, the conveyor system generally 10 is shown in conjunction with a dynamic motorized weighing conveyor generally 12 which is the subject matter of U.S. application Ser. No. 07/592,725 filed Oct. 4, 1990 commonly owned by the assignee of this application. Weighing conveyor 12 includes the usual base frame 13, a load cell 14, a conveyor section 16 and a console 17 which provides a control center for the conveyor 12 and specifically the conveyor section 16. An infeed conveyor 19 supplies product to the conveyor section 16, and an outfeed conveyor 20 transports the weighed article to the conveyor 10 of this invention.

As best seen in FIGS. 2-5, the conveyor 10 includes a base frame 22 which supports a table portion 23. Rotatably attached at one end of the table portion 23 is a drive roller 25 supported by the brackets 26 and 27 and an axle 29 with brackets 26 and 27 connected to base frame 22. A multiplicity of flexible and elastic conveyor strands 31 engage the drive roller 25 in grooves 32 which will be more fully explained later. The conveyor strands are supported on the table portion 23 when an article is placed thereon. Referring to the opposing end of the table portion 23, there is a carriage unit generally 34 which includes the bracket 36 and 37 for supporting driven roller 33 in a manner similar to roller 25. Guide or driven roller 33 is rotatably supported by the axle 39 rotatably carried by the brackets 36 and 37. Also supported by the brackets 36 and 37 is an additional guide roller 40 with the axle 43. Drive roller 25 and guide rollers 33 and 40 each have a portion positioned below the supporting table portion 23 and along opposing edges of the table portion. Rollers 40, 33 and 25 are grooved to receive a multiplicity of the elastic conveyor strands 31, the grooves being indicated by the numeral 41 in conjunction with roller 33 (see FIG. 3).

Figure 2:
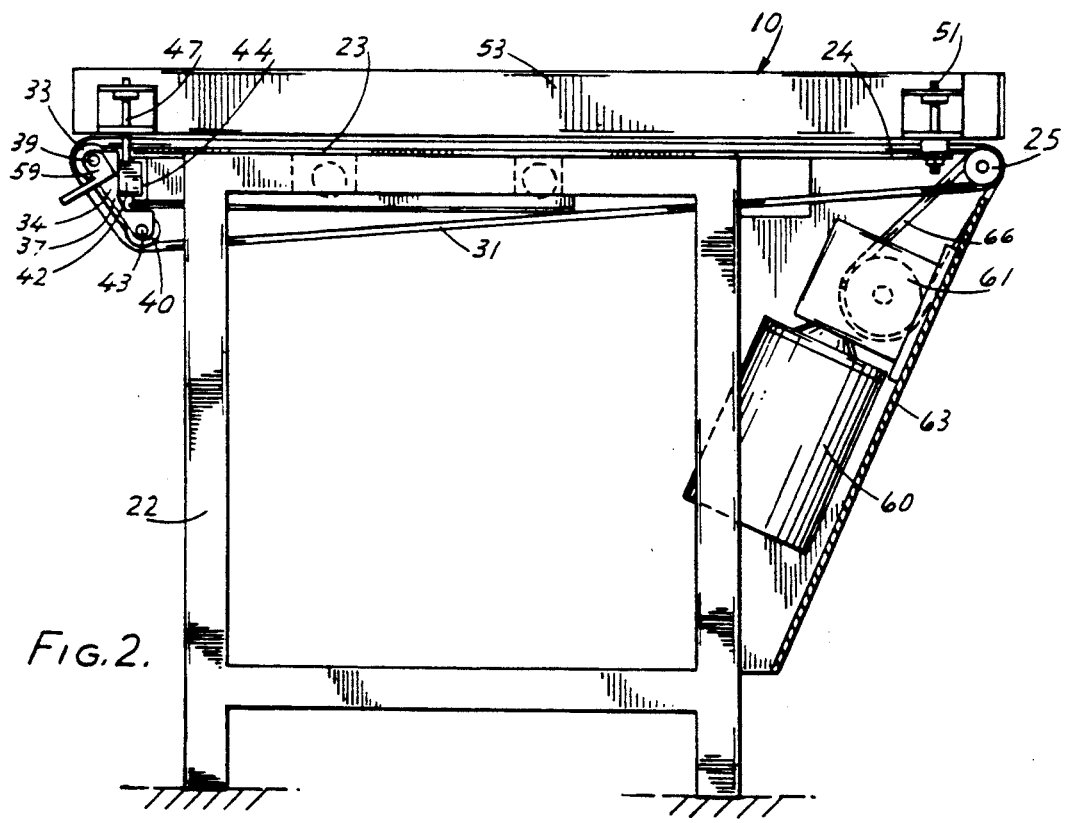
FIG. 2 is a view in side elevation and with portions broken away showing the conveyor of FIG. 1.

As best seen in FIG. 2, the carriage 34 includes a sliding block 42 for horizontal and transverse movement in a guide way 44 provided immediately beneath the table portion 23. Connected to the sliding block 42 are two posts 46 and 47 pivotally supporting guide rails 53 and 54 by means of the attaching brackets 49. At the opposite end of the table portion 23 there are the posts 50 and 51 pivotally mounting the rails 53 and 54 at their opposite ends to the table portion 23 (see FIG. 3).

As best seen in FIGS. 4 and 5, there is a comb member 56 disposed between the rollers 33 and 40. It has the grooves 57 for receiving the strands 31 to assure that they are kept in the grooves in the rollers 33 and 40 when they are moved to various horizontal positions as will be later explained. The comb 56 is secured to the carriage 34 by the brackets 58 and 59 mounted on the axle 39. This is also indicated in conjunction with FIG. 2.

Figure 6:
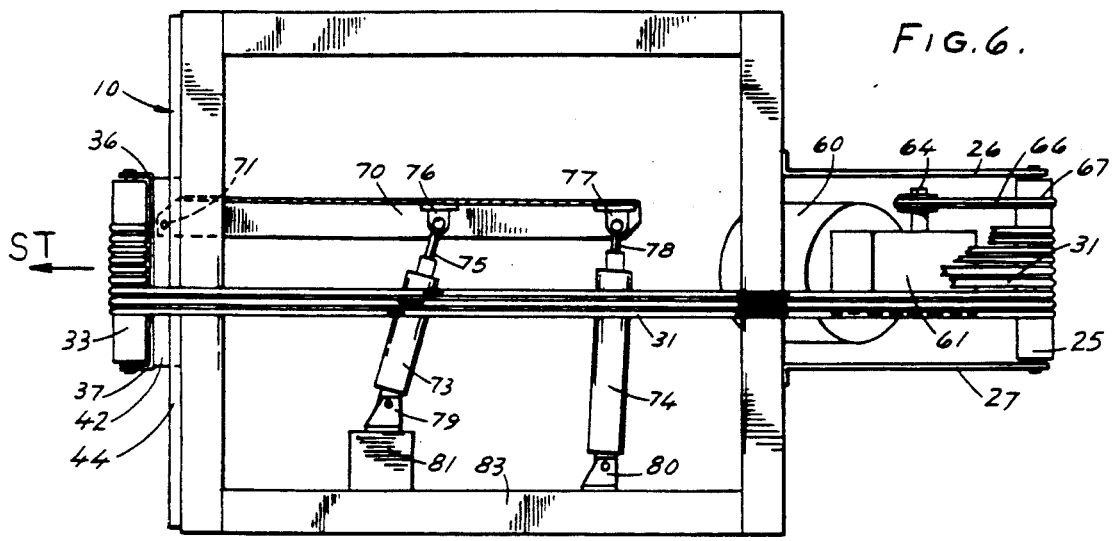
FIGS. 6, 7 and 8 are top plan views illustrating three positions of one embodiment of the conveyor of this invention.

Referring specifically to FIGS. 2, 4 and 6, the drive means for moving the conveyor strands or the conveying support means 31 in a longitudinal manner over the table portion 23 is described. It will include a D.C. motor 60 and a gear reducer 61 suitably supported on a housing support 63 and below the extended portion 24. The reducer 63 has the usual drive shaft 64 on which is placed a drive pulley 65 for driving the drive belt 66 which in turn drives the roller 25. Roller 25 has an additional grove 67 for receiving the drive belt 66.

Figure 7:
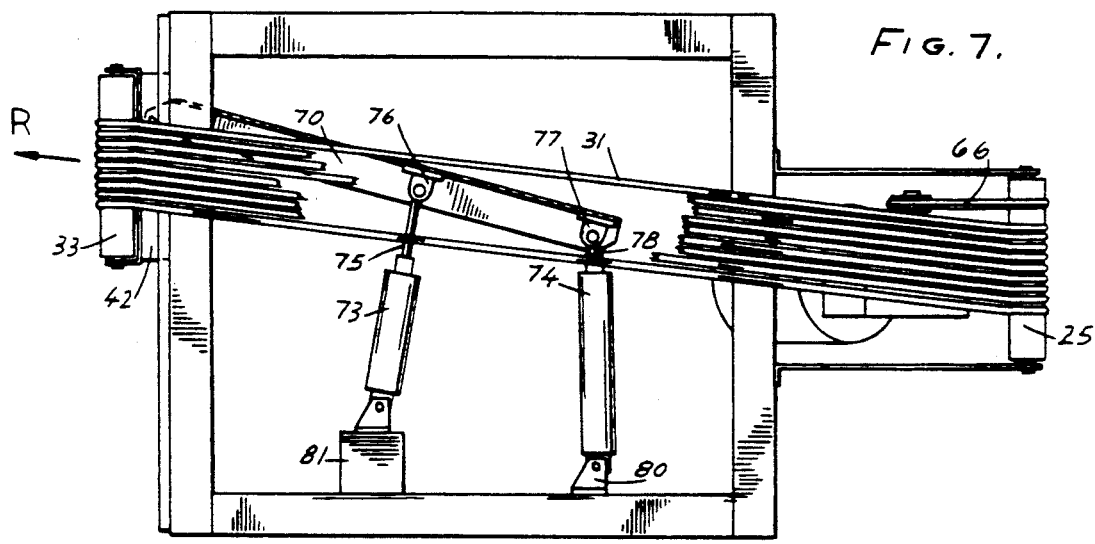

Horizontal movement of the strands 31 is effected in a transverse manner with respect to the longitudinal axis of the strands 31 by means of the arm member 70 which is pivotally attached at 71 to the sliding block 42. This is best seen with respect to FIG. 6. Pivotal attachments are also made to arm member 70 with the air cylinders 73 and 74 by means of the brackets 76 and 77, respectively. At the opposing ends of the cylinders 73 and 74 are additional brackets 79 and 80 with bracket 79 secured to a support block 81 which in turn is connected to upper support 83 of the base frame 22. With respect to cylinder 74, it is directly attached to the upper support 83. Referring specifically to FIG. 6, it is seen that the cylinder 73 is of a shorter dimension than that of cylinder 74 and is positioned at an angle with respect to arm member 70. Cylinder 74 is also positioned at an angle with respect to arm member 70 but to a lesser degree. With both piston rods 75 and 78 of the respective cylinders 73 and 74 placed in a fully retracted position, roller 33 and conveyor strands 31 are positioned in a straight manner with respect to the table portion 23 as indicated by the letters "ST". In order to effect a right positioning as indicated by the letter "R" for the conveyor strands 31, the rod 75 of the cylinder 73 is fully extended as shown in FIG. 7 with the rod 78 of cylinder 74 fully retracted. In this mode, cylinder 74 is brought to an upright position while cylinder 73 remains slightly angled.

Figure 8:
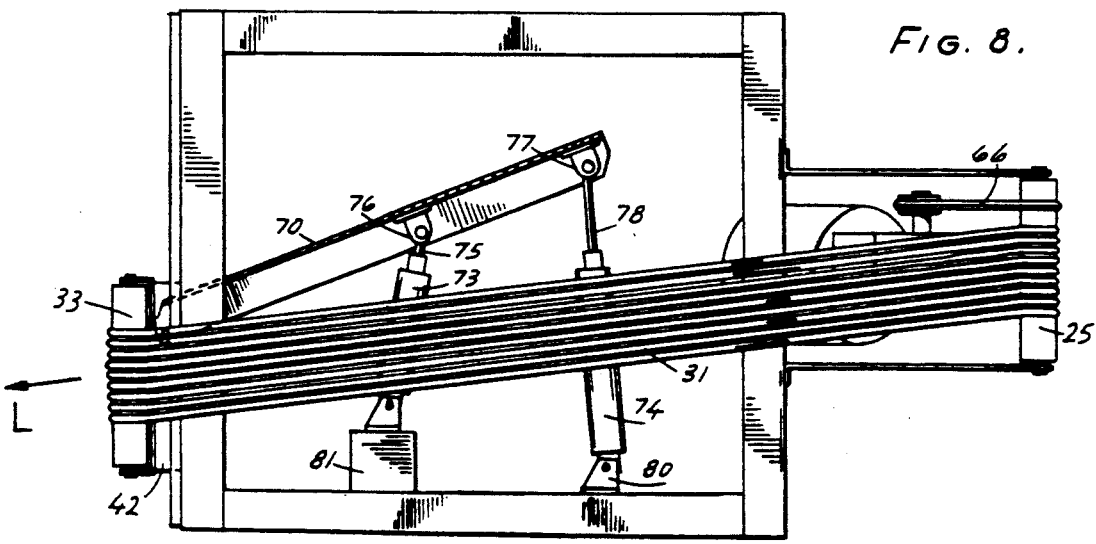

In order to effect a left positioning of the conveyor strands 31 as indicated by the letter "L", the rod 78 of the cylinder 74 is fully extended as indicated in FIG. 8 while that of cylinder 73 is fully retracted. This positions cylinder 74 in a slightly forward angled position with respect to roller 33 while cylinder 73 assumes the same position as shown in FIG. 6 for the straight position.

FIGS. 9 through 12 show an embodiment generally 90 with a four lane positioning of the roller 33 as indicated by the designations "L2" for extreme left, "L1" for slightly left, "R1" for slightly right and "R2" for extreme right. Embodiment 90 employs the same elements as embodiment 10 except for the cylinders 85 and 86 and their mounting to the upper frame support 83. In all other respects embodiment 90 is the same as embodiment 10 with the same parts having the same numbers. Embodiment 90 employs two cylinders 85 and 86 which are of the same size. Another difference from embodiment 10 is the fact that cylinder 86 which is positioned the most remote from the roller 33 has a small supporting block 88. Cylinders 85 and 86 in this instance are of the same size as cylinder 73.

As shown in FIG. 9, when the rod 89 of the cylinder 86 is fully extended and the rod 87 of the cylinder 85 is fully retracted, the roller 33 will be in the L2 position and the cylinders 85 and 86 angled toward the roller 33. When it is desired to place the roller 33 in the L1 position, the rods 87 and 89 of the cylinders 85 and 86, respectively are fully retracted. It should be noted that in this instance this places the cylinders 85 and 86 in an almost upright position. To place roller 33 in the R1 position, the rods 87 and 89 of the cylinders 85 and 86 are fully extended. This places the cylinders in an upright position. In the fourth position designated as "R2", it is seen that cylinder 85 has the rod 87 fully extended and the rod 89 of the cylinder 86 is fully retracted to place the cylinders 85 and 86 in an angled position with respect to roller 33.

Cylinders 73, 74 and 85, 86 which act as extension members to move arm member 70 are typical double acting air cylinders. They are connected to suitable air supply lines which supply pressurized air at one end of the cylinder while providing an exiting of air at the opposing end. The cylinders are activated through commonly known controls such as relays which activate solenoid valves which in turn supply air to the selected cylinder or cylinders. For example, a typical operation of the conveyors 10 and 90 would be in connection with the previously referred to motorized weighing conveyor 12 to divert and separate products into weight zones. When an out of weight range occurs, relays would be activated which would in turn activate the solenoid valves and desired cylinders 73, 74 or 85 and 86 to place the product in the desired zone such as ST, R or L. A further use of the conveyors 10 and 90 would be in conjunction with a photo eye and counter which would detect and separate a number of articles being counted.

An important feature of conveyors 10 and 90 is the simplicity of their construction. It should be noted that only two pneumatic cylinders 73 and 74 or 85 and 86 are utilized to actuate the control arm member 70 through a pivotal linkage to the bar and a pivotal attachment to the upper support 83. No guiding means is required except for the slidable engagement of the slide block 42 for the carriage 34 which slides along the guide way 44. Most importantly, no other retention is required to hold the rollers 33 and 40 or the carriage 34 in the guide way 44 as this is provided by the biasing or tension effect of the conveyor strands 31 which will tend to pull rollers 25, 33 and 40 together.

In the previous description, cylinders 73, 74, 85 and 86 are of the common air or pneumatic activated type. Obviously, hydraulic cylinders could be substituted. The elastic strands 31 are of a urethane plastic composition and are available from Eagle Belting Co. Any type of an elastic strand which is suitably moved by a grooved roller and can and can afford the tensioning effect as previously described can be utilized. Obviously, any number of strands can be employed. A D.C. motor 60 is preferred because of its control capability. However, other prime movers including A.C. motors could be substituted. While the conveyor systems 10 and 90 have been described in conjunction with a dynamic motorized weighing and checking conveyor system, it is obvious that they can be employed in any conveyor system where it is desired to divert items at various positions in the system such as for sorting purposes including metal detection.

Further, while a three and four position conveyor system has been illustrated, the transverse positioning means herein described would also be operable to effect a two position system.

It will thus be seen that through the present invention there is now provided a conveyor having a multiplicity of transverse positions which is simple in its construction and actuation. Accordingly, few components are employed and are readily available, thus, reducing cost and maintenance. In addition, all of the component parts are easily accessible when and if it is desired to replace them for maintenance purposes.

The foregoing invention can now be practiced by those skilled in the art. Such skilled persons will know that the invention is not necessarily restricted to the particular embodiments presented therein. The scope of the invention is to be defined by the terms of the following claims as given meaning by the preceding description.

We claim:

1. A conveyor having transverse positions comprising:
   a supporting frame member having a supporting surface;
   a drive roller operatively connected to one end of said supporting frame in a transversely fixed manner with respect to said supporting surface, said drive roller adapted to be connected to drive means;
   a guide roller operatively connected to an opposing end of said supporting frame in a transversely movable manner with respect to said supporting surface;
   fast acting positioning means operatively connected to said guide roller to move said guide roller in said transverse manner said fast acting positioning means including a pneumatically activated cylinder; and
   elastic strand members positioned in a drivable relationship with respect to said drive roller and being movable transversely by said guide roller over said supporting surface.

2. The conveyor a defined in claim 1 wherein said elastic strand members are formed from a plastic material.

3. The conveyor as defined in claim 1 wherein a portion of each said drive and guide rollers is positioned below said supporting surface.

4. The conveyor as defined in claim 3 wherein said elastic strand members are disposed in a supported relationship on said supporting surface.

5. The conveyor as defined in claim 1 wherein said guide roller is located along an edge of said supporting surface.

6. The conveyor as defined in claim 1 including positioning means operatively connected to said guide roller to position said guide roller and said strand members in at least three different locations.

7. The conveyor as defined in claim 1 further including an additional guide roller connected to said guide roller and movable therewith.

8. A conveyor having transverse positions comprising:
   a supporting frame member having a supporting surface;
   a drive roller operatively connected to one end of said supporting frame in a transversely fixed manner with respect to said supporting surface;
   drive means connected to said drive roller;
   a guide roller operatively connected to an opposing end of said supporting frame in a transversely movable manner with respect to said supporting surface;
   fast acting positioning means operatively connected to said guide roller to move said guide roller in said transverse manner said fast acting positioning means including a pneumatically activated cylinder; and
   elastic strand members positioned in a drivable relationship with respect to said drive roller and being transversely movable by said guide roller over said supporting surface.

9. The conveyor as defined in claim 8 wherein said supporting surface extends outwardly from said supporting frame member and said drive means is positioned under said extending supporting surface.

10. The conveyor as defined in claim 8 wherein said positioning means is connected to said guide roller to position said guide roller and said strand members in at least three different positions.

11. The conveyor as defined in claim 8 wherein said conveyor is positioned downstream of a dynamic weighing conveyor.

12. The conveyor as defined in claim 10 wherein said positioning means position said guide roller and said strand members in four different positions.

13. A conveyor having transverse positions comprising:
   a supporting frame member having a supporting surface;
   a drive roller operatively connected to one end of said supporting frame, said drive roller adapted to be connected to drive means;
   a guide roller operatively connected to an opposing end of said supporting frame in a transversely movable manner with respect to said supporting surface;
   conveying support means positioned in a drivable relationship with respect to said drive roller and said guide roller; and positioning means operatively connected to said guide roller and located between said drive roller and said guide roller, said positioning means including an arm member pivotally connected to said guide roller at one end and pivotally attached to two extension members at points spaced from said one end, said extension members being connected to said frame member.

14. The conveyor as defined in claim 13, wherein said extension members are fluid activated cylinder members having extending and retracting rod members.

15. The conveyor as defined in claim 14 wherein said rod members are pivotally attached to said arm member at one end and said cylinder members are pivotally attached to said frame member at an opposite end.

16. The conveyor as defined in claim 14 wherein said fluid activated cylinder members are pneumatically actuated.

* * * * *